Jan. 10, 1967 D. SILVERMAN 3,298,029

VISIBLE AND DIGITAL TRACE RECORDING

Filed Oct. 25, 1963 5 Sheets-Sheet 1

DANIEL SILVERMAN
INVENTOR.

BY Newell Pottorf

ATTORNEY.

DANIEL SILVERMAN
INVENTOR.

BY Newell Pottorf

ATTORNEY

VISIBLE AND DIGITAL TRACE RECORDING

Filed Oct. 25, 1963 5 Sheets-Sheet 3

DANIEL SILVERMAN
INVENTOR.

BY Newell Pottorf

ATTORNEY.

DANIEL SILVERMAN
INVENTOR.
BY Newell Pottorf
ATTORNEY.

Jan. 10, 1967 D. SILVERMAN 3,298,029

VISIBLE AND DIGITAL TRACE RECORDING

Filed Oct. 25, 1963 5 Sheets-Sheet 5

DANIEL SILVERMAN
INVENTOR.

BY Newell Pottorf

ATTORNEY.

United States Patent Office 3,298,029
Patented Jan. 10, 1967

3,298,029

VISIBLE AND DIGITAL TRACE RECORDING

Daniel Silverman, Tulsa, Okla., assignor to Pan American Petroleum Corporation, Tulsa, Okla., a corporation of Delaware Filed Oct. 25, 1963, Ser. No. 318,931
11 Claims. (Cl. 346—49)

This invention relates to the recording of well-log data and is directed particularly to the recording of such data in digital form for utilization by digital computers and the like. More particularly, the invention is directed to recording well-log data in a form suitable both for analog representation and use, and for subsequent digitizing by automatic means.

In the recording of data obtained in well logging, the conventional form of record is a strip chart along which the length dimension corresponds to well depth, while the width dimension represents amplitude variations of the log data. Thus, the conventional strip log exhibits one or more traces extending lengthwise at varying distances from the edge of the strip corresponding to data amplitude variations with depth in a well.

Use is made of these visible-trace log records in many ways, varying from simple visual inspection to careful measurement of trace amplitudes for making quantitative calculations. For the latter purpose, however, numerical determinations of successive amplitude values, particularly in a form usable by modern binary digital computing machines, are much to be preferred. The provision of equipment for digital recording of the data simultaneously with making the visible-trace recording, however, is quite expensive. In fact, the cost of equipment presently available for providing digitized log data in a field recording system is so great as to discourage the use of logs in this form.

It is accordingly a primary object of my invention to provide a novel and improved system for obtaining digitized well logs which avoids a substantial part of the expense of the prior-art systems. A further object is to provide a log recording and playback system adaptable at small cost to present well-log recording equipment, to provide visible-trace logs in a form adaptable both for visual inspection and for subsequent digitizing in a central playback office. A still further object is to provide a method and apparatus for recording a plurality of well-log information traces on a visible-trace data strip chart in a form adaptable for subsequent digitization of the several traces substantially independently of each other. Other and further objects, uses, and advantages of the invention will become apparent as the description proceeds.

Briefly stated, the foregoing and other objects are accomplished in my invention by providing each conventional field recorder with trace-modulating means such that each visible recorded trace has not only its former character of visible readability, but also a characteristic different from any other trace or line on the record chart, to which characteristic a curve-following or scanning system can uniquely respond. The field trace-modulating system preferably is such as to connect with or adapt to the field recorder with a minimum degree of modification and expense, while the more costly items of playback equipment for transforming the visible traces automatically into digital form can be located at a central playback location serving a number of field recording units. This will be better understood from the accompanying drawings forming a part of this application, in which drawings:

Figure 1:
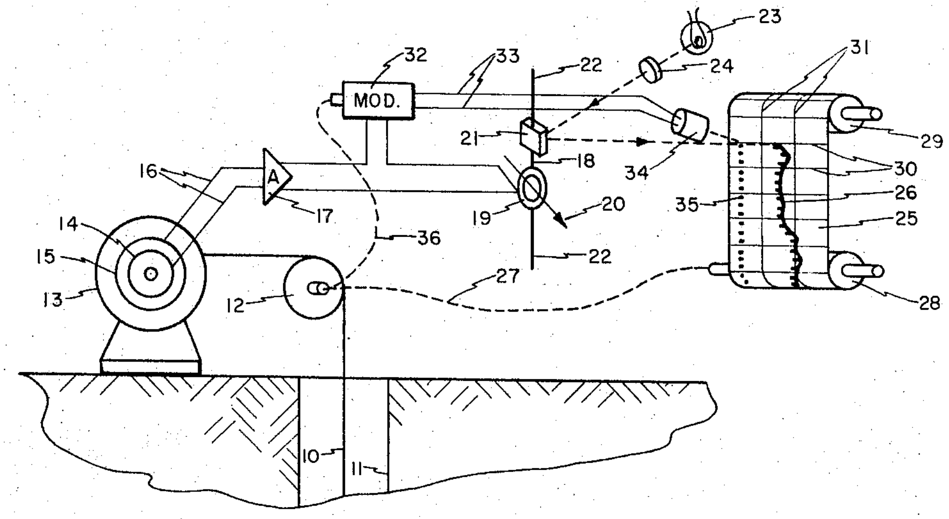
FIGURE 1 shows diagrammatically a field recording system embodying the invention.

Referring now to these drawings, and particularly to FIGURE 1 thereof, this figure shows in diagrammatic form a typical field recording unit used for recording well-log data as a function of depth. Thus, an insulated-conductor cable 10 extending from an instrument (not shown) at some depth in a well bore 11 passes over a depth-measuring wheel 12 to a cable reel and winch mechanism 13. Slip rings 14 and 15 on reel 13 transmit logging signals from the cable 10 by leads 16 to an amplifier 17, the output of which is connected to a recorder such as the recording galvanometer 18, typically comprising a coil 19, in a magnetic field indicated by arrow 20, and rotating a mirror 21 about an axis defined by the suspension wires 22. A beam of light from a source 23, focused by a lens 24 on mirror 21 and thence to a photographically sensitive recording chart 25, records on chart 25 a longitudinal trace 26 which is rendered visible by appropriate photographic processing, while the chart 25 is moved lengthwise in accordance with depth in the well 11 by a driving connection 27 from the depth-measuring wheel 12 to a takeup spool 28 drawing the strip chart 25 from a supply reel 29. Besides the trace 26, the chart 25 may also have inscribed thereon depth lines 30 as well as amplitude lines 31.

The system thus far described is generally conventional in form, and to this system it is necessary only to add for purposes of the present invention a modulating voltage source 32, connected in series with the output of amplifier 17 going to the galvanometer coil 19, and also feeding over the leads 33 a glow tube 34 which records along the edge of chart 25 a trace 35 showing the form of modulation applied to the trace 26. That is, modulator 32 supplies a small biasing or marking voltage insufficient to affect the amplitude of the trace 26 but effective to impart to the trace 26 a distinctive character having the same frequency or pulse form as the modulating voltage from source 32. In order to prevent changes in logging speed from appearing to alter the character of the modulation, a linkage 36 to depth drive wheel 12 preferably controls the operation of modulator 32, so that its output changes with logging speed to maintain the modulation character constant.

Figure 2:
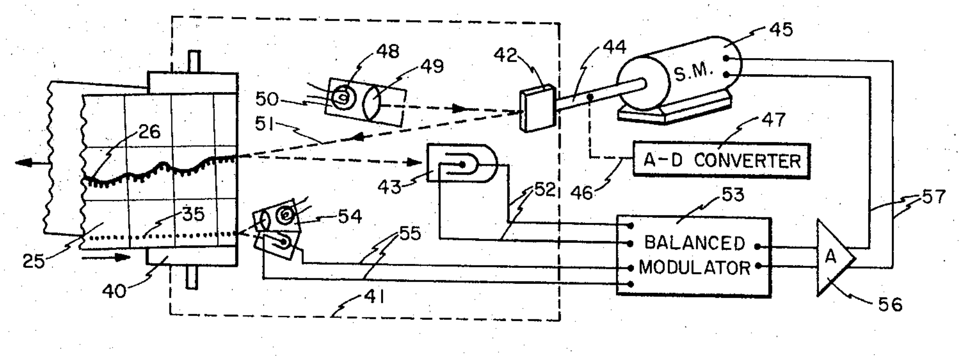
FIGURE 2 shows diagrammatically a digitizing playback system for providing digital log information from the visibly recorded trace of FIGURE 1.

In FIGURE 2 is shown in diagrammatic form a digitizing playback system suitable for location at a central point to which the modulated logs 25 from a number of field recording units may be sent for transcription. Thus, the playback equipment includes a roller or drum 40 around which the strip chart 25 passes as it is drawn from a supply reel to a takeup reel (not shown) preferably at constant speed. Within a light-tight enclosure 41, including the drum 40, is a rotatable mirror 42 and a photocell 43. Mirror 42 is rotatable by the output shaft 44 of a servo-motor 45, shaft 44 also being connected by a drive 46 to an analog-digital encoder or converter 47, which produces a digital output varying in accordance with the angular position or rotation of shaft 44 and mirror 42. Light from a source 48 in a housing 50 is focused by a lens 49 to mirror 42 and thence as a beam 51 to the edge of the trace 26. This illumination of the trace 26 produces a corresponding output of the photocell 43 connected by leads 52 to a balanced modulator 53 acting as a narrow band-pass filter at the frequency of the trace modulation. The output of modulator 53, after amplification by the power amplifier 56, is applied in the proper polarity to drive servo-motor 45 in a self-balancing sense.

Modulator 53 is only one example of a means for limiting the response of the follower system to the modulated trace 26. As linkage 36 maintains the modulation constant with depth, despite logging speed variations, a simple narrow band-pass filter tuned to the modulation frequency, as determined by the constant speed of drum 40, could be used instead of modulator 53, and trace 35 could be omitted; but using the recorded modulation trace gives better results.

Figure 3:
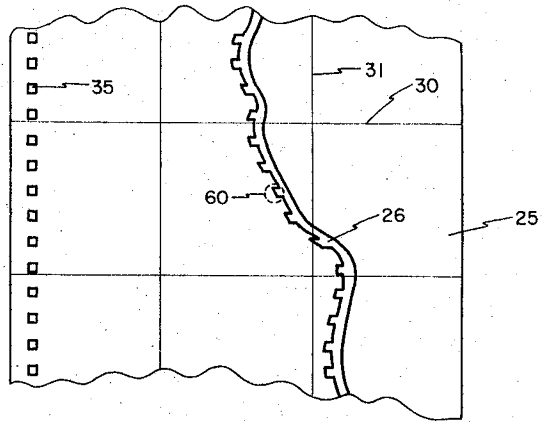
FIGURE 3 is an enlarged view of a section of a typical recorded log shown in FIGURES 1 and 2.
Figure 4:
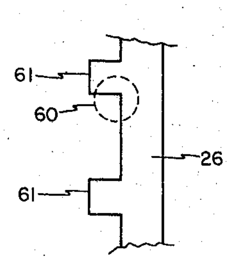
FIGURE 4 is a detailed view of the modulated trace of the log of FIGURE 3.

The manner in which this system operates will be better understood by reference to FIGURES 3 and 4. Thus, as appears in FIGURE 3, the trace 26 is essentially of constant width except where it is momentarily widened by an impulse corresponding to the modulation shown by trace 35. As appears more clearly in FIGURE 4, the dotted circle 60 represents the typical spot formed by beam 51 from mirror 42, the reflection from which spot actuates the photocell 43. That is, the output of photocell 43 includes a steady current component due to the continuous portion of the trace 26 and superimposed thereon an alternating component due to the momentary widening of the trace at points 61, in accordance with the modulation of the modulator 32 as recorded on trace 35. Thus, over the leads 52 is transmitted a pulsating direct current to the balanced modulator 53. A current of frequency similar to that of the pulsations is transmitted by the unit 54 over the leads 55 to modulator 53, so that its output going to amplifier 56 is a varying direct-current voltage, which after amplification is applied over the leads 57 to the servo-motor 45 in a sense to maintain the voltage at a constant average value. That is, as trace 26 varies in position across the width of the strip 25, servo-motor 45 tends to keep scanning spot 60 in an exact position such as that shown on the trace 26 as represented in FIGURE 4. In addition, the frequency represented by modulation trace 35 and peaks 61 insures that only trace 26 affects the control current fed to motor 45 rather than any of the other lines appearing on chart 25.

Figure 5:
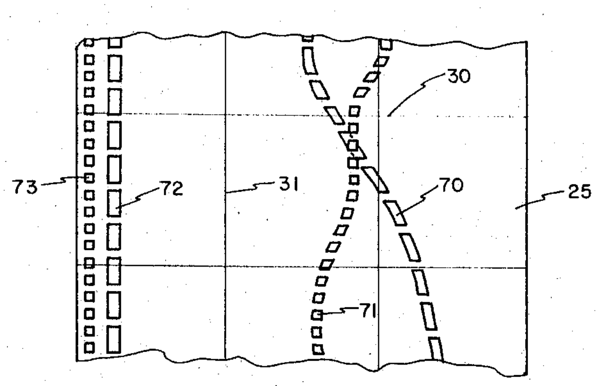
FIGURE 5 is an enlarged view of a recorded log showing an alternative embodiment of the invention.

The varying-width modulation of the trace 26 shown in the foregoing figures is only one of many possible forms of trace modulation which can be used according to my invention. An alternative form is shown in FIGURE 5 in which are recorded two logging data traces 70 and 71, which may simply correspond to the ordinary continuous logging traces interrupted with two different frequencies. Preferably also recorded along the edge of chart 25 are corresponding modulation traces 72 and 73 which furnish signals for a balanced modulator, as modulator 53 in FIGURE 2, or to a similar filtering system for passing only the desired frequency, to cause following of only one of the two curves 70 and 71 by the galvanometer beam 51. Traces 70 and 71 may be regarded as two different frequencies, or as having two different ratios of line segment to gap. It will be apparent that either the frequency or the ratio characteristic can be utilized for follower control.

Figure 6:
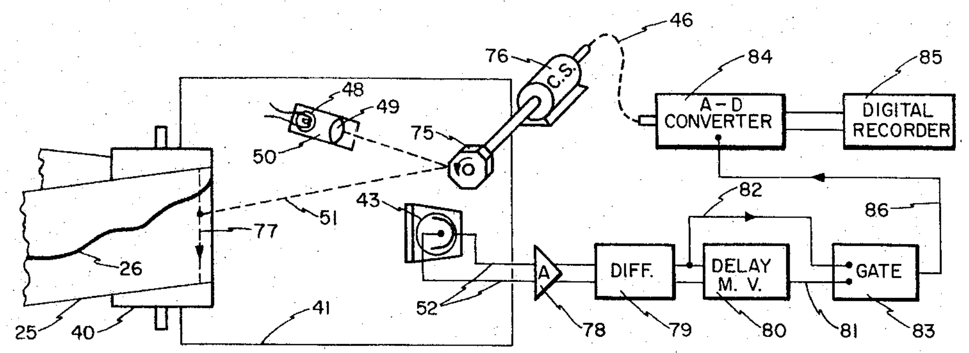
FIGURE 6 shows diagrammatically an optical scanning-type of curve-digitizing apparatus.

Referring now to FIGURE 6, this figure shows an optical scanning type of curve follower for digitizing a recorded log in accordance with my invention. In this case light from the source 48 is focused by the lens 49 into a beam 51 reflected from the successive faces of a multifaceted rotating mirror 75, rotated at constant speed by a motor 76. This causes the beam 51 to scan across the width of chart 25 in the manner indicated by dashed line 77. The output of photocell 43, amplified by an amplifier 78 and differentiated by means 79, is applied to a multivibrator circuit 80 which produces on its output lead 81 a delayed gate pulse. This is received by a coincidence gate circuit 83 also fed with the differentiator output pulses by the lead 82. When the pulses present on leads 81 and 82 are in coincidence, an output pulse is transmitted over lead 86 to the analog-digital converter mechanism 84, actuated according to angular shaft position of the motor 76 through the connection 46, and a digital measurement of the position of trace 26 is recorded on the digital recorder 85. Each scan of beam 51 along line 77 produces one digital measurement, so that a succession of such digits is obtained as drum 40 rotates and moves strip 25 lengthwise.

Figure 7:
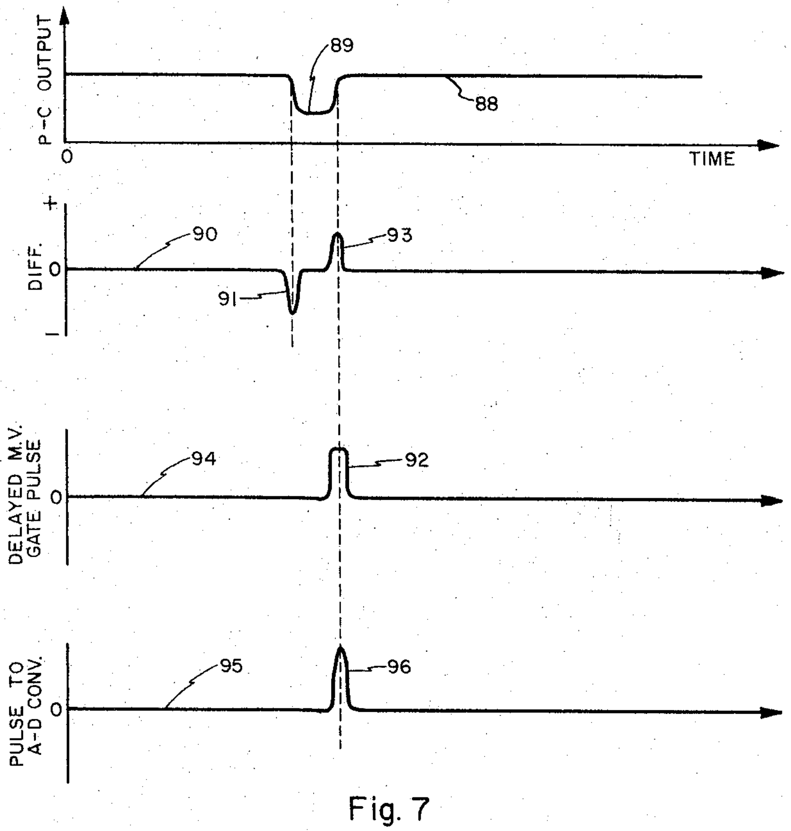
FIGURE 7 shows graphs illustrating the operation of the apparatus of FIGURE 6.

The manner of operation of this embodiment may be better understood from FIGURE 7 wherein the trace 88 corresponds to the output voltage or current of photocell 43 as the scanning spot of beam 51 sweeps across chart 25 from edge to edge. The dip 89 in photocell output corresponds to the movement of the scanning spot across the line 26. The output of the differentiator 79, as shown by trace 90, thus consists of a negative pulse or spike 91 as the scanning spot encounters the leading edge of trace 26 and the positive spike 93 as the spot completes its sweep across the width of the trace 26. The trace 94 corresponds to the output of multivibrator circuit 80 triggered by impulse 91 and producing a delayed output gate pulse 92. Since this corresponds in time to the positive pulse 93 of trace 90, the coincidence of these two pulses in gate circuit 83 causes transmission of a pulse over lead 86 as shown by trace 95. It is pulse 96 of this trace which actuates the converter 84 and produces the digital recording of one amplitude determination by the recorder 85. Thus, as the beam 51 sweeps successively across the face of record 25, each such sweep produces a corresponding digit representing the trace amplitude by the recorder 85. By recording line 26 as a line of different width or thickness from any others encountered in the sweep along line 77, the positive spikes 93 for the other lines are discriminated against because they do not coincide with delayed gate pulse 92.

Figure 8:
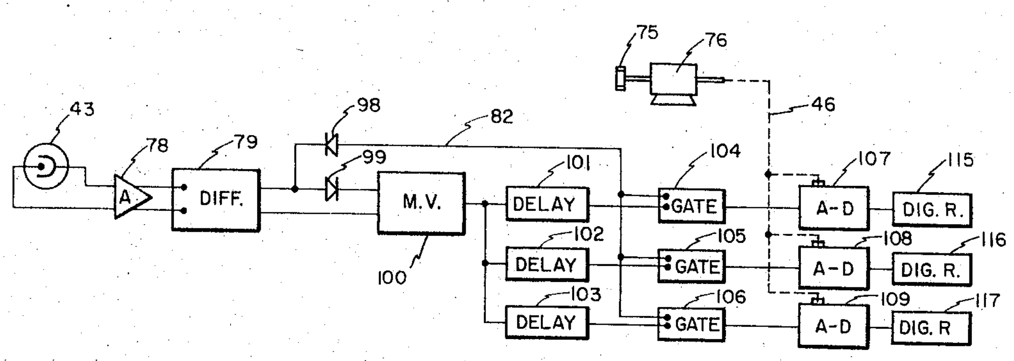
FIGURE 8 shows diagrammatically a modification of the apparatus of FIGURE 6.
Figure 9:
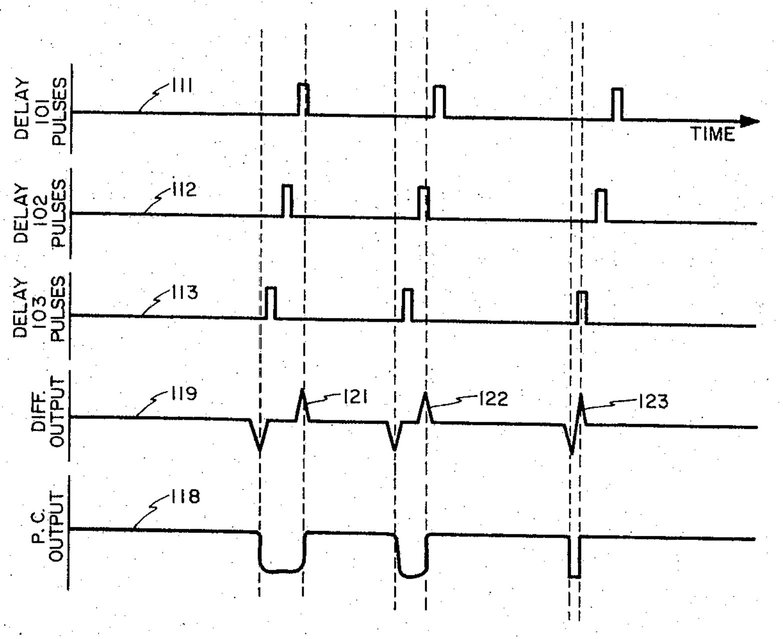
FIGURE 9 shows graphs illustrating the operation of the apparatus of FIGURE 8.

In FIGURE 8 is shown a further embodiment similar to that of FIGURE 6 wherein a plurality of traces are digitized simultaneously. By way of example, it is assumed that the traces are differentiated by different widths of trace line, and FIGURE 8 shows a system capable of recognizing the different traces on this basis of distinction. Here the output of differentiator 79 is applied through a diode 99 to a multivibrator circuit 100 to produce an output pulse through three different delay units 101, 102, and 103, which provide gate pulses with three different delays. Diode 99 is polarized so that only pulses of one polarity (here assumed negative, for example) trigger multivibrator 100. Thus, trace 111 of FIGURE 9 represents the gate pulse output of delay unit 101 into the gate circuit 104. Similarly, trace 112 corresponds to the gate pulse output of delay unit 102 into gate circuit 105. In the same way trace 113 corresponds to the gate pulse output of delay unit 103 into gate circuit 106. When the delayed gate and trace-scan pulses occur together, coincidence gate circuits 104, 105, and 106 respectively transmit pulses to analog digital converters 107, 108, and 109 responsive simultaneously to the angular shaft position of the motor 76 and respectively actuating digital trace recorders 115, and 116 and 117. A diode 98 in lead 82 assures that only the positive output pulses of differentiator 79 actuate gates 104, 105, and 106.

The trace 118 of FIGURE 9, for example, represents the voltage of photocell 43 as beam 51 scans across lines of three different widths on the chart 25. The trace 119 represents the pulses at the output of differentiator 79. As it can be seen that the pulse 121 coincides only with the gate pulse of delay unit 101 shown by trace 111, the position of pulse 121 relative to the edge of chart 26 is thus transmitted only to digital recorder 115. Correspondingly, since pulse 122 coincides only with the gate pulse of delay unit 102 shown on the trace 112, this position is that transmitted only to digital trace recorder 116. Likewise, trace 123 coinciding with the gate pulse of delay unit 103 as shown by trace 113 is transmitted to digital recorder 117. The continuing rotation of the mirror 75 by motor 76 and the transmission of this rotation through the connection 46 to all of the converters 107, 108, and 109 simultaneously, thus insures that the different digits recorded by recorders 115, 116, and 117 respectively indicate amplitudes of the various traces.

While this is given only as an example of coding of traces by line width, many other ways of accomplishing simultaneous digitizing of a plurality of traces will be apparent to those skilled in the art. The character of traces 26, 70, and 71 of FIGURES 3 and 5 could also be recognized by the scanning system of FIGURE 6, by elaboration of a system like FIGURE 8 in ways that will be apparent to those skilled in the art. Alternatively, different traces may be recorded in different colors of ink and a plurality of scanning photocells employed in place of the single photocell 43, each of the photocells being responsive only to the impulse produced by scanning across a line of a certain color. That is, appropriate optical filters could prevent the photocell responsive to a line of one color from recognizing and responding to lines of any different color.

Figure 10:
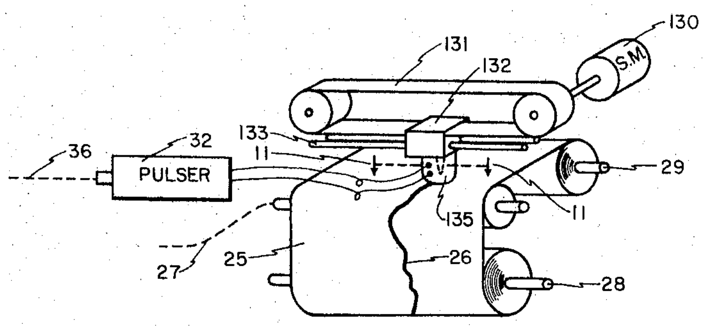
FIGURE 10 shows diagrammatically a pen recovering system to which my invention is applied.
Figure 11:
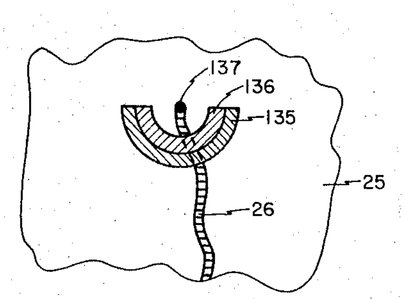
FIGURE 11 is a partial cross section of FIGURE 10 on the line 11—11.
Figure 12:
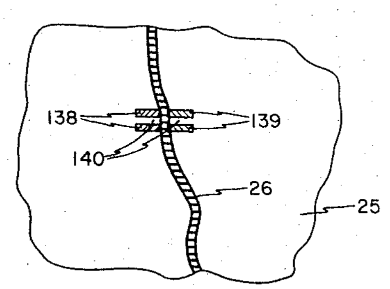
FIGURE 12 is a view similar to FIGURE 11 of pickup heads for detecting and digitizing the trace made according to FIGURES 10 and 11.

That my invention is not limited to photographic recording and photoelectric scanning is illustrated by the embodiment of FIGURE 10. This represents diagrammatically a servo-driven pen recording unit of a conventional type in which a servo-motor 130, by a belt 131, moves a penholder 132 along guides 133 across the record strip 25. The pen of holder 132 preferably draws trace 26 with magnetic ink, and the trace is then intermittently magnetized by a magnetic head 135 on holder 132 having a semicircular recording gap 136 concentric with the point 137 of the pen, as shown in FIGURE 11. The modulator 32 supplies magnetizing electric current pulses to head 135 at the chosen frequency or depth intervals as established by drive 36.

For digitizing, a follower system similar to the recorder of FIGURE 10 utilizes a pair of magnetic pickup heads 138 and 139 closely spaced in the transverse chart direction and energizing the servo-motor 130 to keep magnetic ink trace 26 centered between them. Transverse gaps 140 detect the modulation applied by head 135 to insure following of magnetic ink trace 26 when it crosses any other lines or traces present on strip 25. This modulation also serves as the varying flux by which heads 138 and 139 sense the presence of trace 26 as record 25 is moved past them. It will be understood that the position of servo 130 is transmitted to converter 47 as in FIGURE 2.

It will be understood that the forms of curve-following system shown in FIGURES 2, 6, 8, and 12 are only exemplary of a large number of followers or scanners which can be adapted to utilize the present invention. That is, from the foregoing it will be obvious to those skilled in the art how any of numerous curve-tracing and following devices can be programmed to recognize and follow a particular modulated trace in the presence of other traces and lines, either unmodulated or differently modulated. The scope of the invention, therefore, should not be considered as limited to the details set forth, but is properly to be ascertained from the appended claims.

I claim:

1. A system for producing both a visible and a digitized data trace, for use in association with a conventional recorder producing at least one visible data trace extending along a chart in strip form, said system comprising means associated with said recorder for applying to said data trace a modulation character, besides its deflection, differentiating it from every other line and trace on said chart, means for scanning said chart and producing a response both to the position of said data trace and to said modulation character, motor means for moving said chart-scanning means, means utilizing the response of said chart-scanning means to both said trace and to said modulation character to actuate said motor means in a sense to cause said chart-scanning means to sense only said trace, and means connected to said motor means for producing a succession of digits representing corresponding successive amplitude values of said data trace.

2. A system as in claim 1 including also means for recording a modulation trace bearing said modulation character on said chart, and means for scanning said modulation trace to derive therefrom a signal representing said modulation character, said motor-actuating means utilizing both the responses of said chart-scanning and of said modulation-trace-scanning means to cause and chart-scanning means to follow said data trace.

3. A system in claim 2 wherein the modulation character of said data trace and of said modulation trace affects the recording of said traces periodically at approximately uniform intervals of length along said chart, said response-utilizing means including a balanced modulator having two inputs respectively receiving signals from said chart-scanning and said modulation-trace-scanning means, the output of said modulator being applied to actuate said motor means to cause following of said data trace.

4. A system as in claim 1 wherein said modulation-character-applying means affects the recording of said trace periodically at uniform intervals of length along said chart, whereby scanning of said chart as it moves at constant speed produces signals of a definite frequency, said response-utilizing means including a filter passing substantially only said frequency to actuate said motor means.

5. A system as in claim 1 wherein said chart-scanning means comprises means for causing a beam of radiant energy to make a sweep transversely across said strip, signal-producing means responsive to the crossing by said beam of each line or trace encountered in said sweep together with any characteristic modulation of said line or trace differentiating it from all other lines or traces, and means for transmitting substantially only signals representing the modulation character of said data trace to said response-utilizing means for actuation of said digit-producing means at angular positions of said motor means corresponding to the crossing of only said data trace by said beam during said sweep.

6. A system as in claim 1 wherein said chart-scanning means comprises means for directing a beam of radiation to impinge said data trace and have its reflection from said chart alterted thereby, light-sensitive means for detecting both said altered reflection and the modulation character of said data trace, said response-utilizing means including means acting to select substantially only the signals of said light-sensitive means derived from said modulation character to actuate said motor means and cause it to redirect said beam to follow substantially only said data trace as its deflection varies.

7. A system as in claim 1 wherein said visible data trace is formed by depositing magnetic particles on said chart, said modulation-character-applying means magnetizes said particles in a unique repetitive pattern, and wherein said chart-scanning means comprises magnetic-flux-responsive means for detecting both the presence of said trace and said repetitive magnetization pattern, said response-utilizing means selecting substantially only signals corresponding to said pattern to actuate said motor means and cause following of said data trace.

8. A system as in claim 1 wherein a plurality of data traces are simultaneously recorded on said strip and said modulation-character-applying means modulates each of said plurality of traces differently from each other and from any other lines on said chart, said chart-scanning means for sweeping a beam of radiant energy transversely across said chart, and means responsive both to the crossing by said beam of each trace and to its characteristic modulation, and wherein said response-utilizing means is actuated by said modulation character to cause recording of a digit representing a given data trace by the corresponding one of a plurality of digit-producing means.

9. A system for producing both a visible and a digitized data trace, for use in association with a conventional recorder producing a visible data trace extending along a chart in strip form, said system comprising means for recording said data trace on said strip in a form different from any other line or trace occurring on said strip, means for detecting the presence and position of said trace on said strip including means for producing a signal indicative of said form, and means for registering digits indicating successive values of said position, said registering means being activated by said position-detecting means only when said form-indicating signal is simultaneously detected.

10. A system as in claim 9 wherein said recording means records said data trace with a characteristic width different from any other line or trace on said strip, and wherein said signal-producing means produces an output actuating said registering means only upon the detection of a line of said characteristic width.

11. A system for producing both a visible data trace on a strip chart and a succession of numbers representative of successive values of the data represented by said trace comprising a strip chart, means for moving said chart lengthwise in accordance with one coordinate of said data, means for marking said chart with a trace positioned in the chart-width dimension in accordance with another coordinate of said data, means for varying the marking of said chart by said marking means in a unique way to impart to said data trace a characteristic different from any other trace or line on said chart, a curve follower including means for moving said chart lengthwise and an element movable in the width dimension of said chart, photoelectric means responsive to the presence of said data trace when it is encountered by said element moving in the width dimension of said chart, circuit means connected to said photoelectric means to derive therefrom an electric signal representative of said trace characteristic and of the presence of said data trace, servo-means connected to said circuit means and actuated by said electric signal to move said element and cause it to follow said data trace, and digitizing means driven by said servo-means to produce said succession of numbers representative of successive values of the data recorded by said data trace.

References Cited by the Examiner

UNITED STATES PATENTS

| | | | |
|---|---|---|---|
| 2,775,503 | 12/1956 | Peterson | 346—49 X |
| 3,059,119 | 10/1962 | Zenor | 250—219 |
| 3,198,949 | 8/1965 | Holdo | 250—202 |

RICHARD B. WILKINSON, *Primary Examiner.*